(12) United States Patent
Bedell et al.

(10) Patent No.: US 7,075,750 B2
(45) Date of Patent: Jul. 11, 2006

(54) APPARATUS FOR PATTERNING A SELF-ALIGNED COIL USING A DAMASCENE PROCESS

(75) Inventors: Daniel Wayne Bedell, San Jose, CA (US); Quang Le, San Jose, CA (US); Edward Hin Pong Lee, San Jose, CA (US); Son Van Nguyen, Los Gatos, CA (US); Vladimir Nikitin, Campbell, CA (US); Murali Ramasubramanian, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 87 days.

(21) Appl. No.: 10/652,877

(22) Filed: Aug. 29, 2003

(65) Prior Publication Data

US 2005/0047014 A1    Mar. 3, 2005

(51) Int. Cl.
*G11B 5/147*    (2006.01)

(52) U.S. Cl. ........................................ 360/126; 360/123

(58) Field of Classification Search ................ 360/126, 360/123, 317
See application file for complete search history.

(56) References Cited

U.S. PATENT DOCUMENTS

| | | | |
|---|---|---|---|
| 5,331,495 A | 7/1994 | Yoshida et al. | |
| 5,448,822 A | 9/1995 | Wu et al. | |
| 5,470,491 A | 11/1995 | Kodama et al. | |
| 5,512,394 A | 4/1996 | Levenson et al. | |
| 5,621,596 A | 4/1997 | Santini | |
| 5,665,251 A | 9/1997 | Robertson et al. | |
| 5,684,660 A | 11/1997 | Gray et al. | |
| 6,072,669 A | 6/2000 | Indeck | |
| 6,377,423 B1 | 4/2002 | Dill, Jr. et al. | |
| 6,466,402 B1 | 10/2002 | Crue, Jr. et al. | |
| 6,765,756 B1 * | 7/2004 | Hong et al. | 360/126 |
| 6,791,793 B1 * | 9/2004 | Chen et al. | 360/126 |
| 6,809,899 B1 * | 10/2004 | Chen et al. | 360/126 |
| 6,877,213 B1 * | 4/2005 | Zolla | 360/126 |
| 6,912,106 B1 * | 6/2005 | Chen et al. | 360/126 |

* cited by examiner

*Primary Examiner*—Robert S. Tupper
(74) *Attorney, Agent, or Firm*—Chambliss, Bahner & Stophel; David W. Lynch

(57) ABSTRACT

An apparatus for patterning a self-aligned coil using a damascene process is disclosed. Coil pockets are formed in a first insulation layer disposed over a first pole layer. A barrier/seed layer is deposited along walls of the coil pockets in the insulation layer. Copper is formed in the coil pockets and over the insulation layer. The copper is planarized down to the insulation layer. The self-aligned coil process packs more copper into the same coil pocket and relaxes the coil alignment tolerance. Protrusions are prevented because of the more efficient and uniform spacing of the coil to reduce heat buildup in the head during a write.

9 Claims, 9 Drawing Sheets

APPARATUS FOR PATTERNING A SELF-ALIGNED COIL USING A DAMASCENE PROCESS

BACKGROUND OF THE INVENTION

1. Field of the Invention

This invention relates in general to the manufacture of magnetic heads, and more particularly to an apparatus for patterning a self-aligned coil using a damascene process.

2. Description of Related Art

People need access to an increasing amount of information in our technologically advancing society. Data storage using magnetic disk drives is well known and widely used because magnetic disk devices facilitate fast storage and access of large amounts of information. A typical disk drive is comprised of a magnetic recording medium in the form of a disk for storing information, and a magnetic read/write head for reading or writing information on the disk. The disk rotates on a spindle controlled by a drive motor and the magnetic read/write head is attached to a slider supported above the disk by an actuator arm. When the disk rotates at high speed a cushion of moving air is formed lifting the air bearing surface (ABS) of the magnetic read/write head above the surface of the disk.

As disk drive technology progresses, more data is compressed into smaller areas. Increasing data density is dependent upon read/write heads fabricated with smaller geometries capable of magnetizing or sensing the magnetization of correspondingly smaller areas on the magnetic disk. The advance in magnetic head technology has led to heads fabricated using processes similar to those used in the manufacture of semiconductor devices.

The read portion of the head is typically formed using a magnetoresistive (MR) element. This element is a layered structure with one or more layers of material exhibiting the magnetoresistive effect. The resistance of a magnetoresistive element changes when the element is in the presence of a magnetic field. Data bits are stored on the disk as small, magnetized region on the disk. As the disk passes by beneath the surface of the magnetoresistive material in the read head, the resistance of the material changes and this change is sensed by the disk drive control circuitry.

The write portion of a read/write head is typically fabricated using a coil embedded in an insulator between a top and bottom magnetic layer. The magnetic layers are arranged as a magnetic circuit, with pole tips forming a magnetic gap at the air bearing surface of the head. When a data bit is to be written to the disk, the disk drive circuitry sends current through the coil creating a magnetic flux. The magnetic layers provide a path for the flux and a magnetic field generated at the pole tips magnetizes a small portion of the magnetic disk, thereby storing a data bit on the disk.

The read/write head is formed by deposition of magnetic, insulating and conductive layers using a variety of techniques. Fabrication of the write head coil requires a metallization step wherein the metallization is formed in the shape of a coil. The damascene process is a technique used for forming metallization layers in integrated circuits. Generally, the damascene process involves forming grooves or trenches in a material, and then electroplating to fill the trenches with metal. After a trench is formed, however, a seed layer must first be deposited in the trench to provide an electrically conductive path for the ensuing electrodeposition process. Metal is then deposited over the entire area so that the trench is completely filled. The damascene process used in semiconductor device fabrication requires fewer process steps compared to other metallization technologies. To achieve optimum adherence of the conductor to the sides of the trench, the seed layer deposited prior to deposition of the metal must be continuous and essentially uniform.

With the increasing demand for higher data rate has correspondingly fueled the reduction of the yoke length, coil pitch and hence the overall head structure. As the head structure shrinks, protrusion becomes more critical and advancements in head fabrication and materials are needed. Experimental evidence has indicated that the coil area contributes significantly to protrusion.

One method to reduce protrusion is to increase the surface area of the first pole P1 (N4) to act as an effective heat sink and bring the coil closer to P1 by reducing the write gap thickness ($Al_2O_3$). In addition, the conventional alignment scheme for coil fabrication using either through mask plating or a damascene process does not effectively utilize the space within the coil pocket.

It can be seen that there is a need for an apparatus for patterning a self-aligned coil using a damascene process.

SUMMARY OF THE INVENTION

To overcome the limitations in the prior art described above, and to overcome other limitations that will become apparent upon reading and understanding the present specification, the present invention discloses an apparatus for patterning a self-aligned coil using a damascene process.

The present invention solves the above-described problems by providing a self-aligned coil process that packs more copper into the same coil pocket and relaxes the coil alignment tolerance.

A magnetic transducer in accordance with an embodiment of the present invention is provided. The magnetic transducer includes a write head that includes a first pole layer, a first insulation layer disposed over the first pole layer, the first insulation layer having coil pockets therein, a barrier/seed layer disposed along the walls of the coil pockets in the first insulation layer and copper disposed in the coil pockets and over the first insulation layer to form a coil for inducing a magnetic flux.

In another embodiment of the present invention, a magnetic storage device is provided. The magnetic storage device includes magnetic media for storing data thereon, a magnetic transducer for reading and writing data on the magnetic media, a motor for translating the position of the magnetic media and an actuator for positioning the magnetic transducer relative to the magnetic media, wherein the magnetic transducer further includes a write head, the write head further includes a first pole layer, a first insulation layer disposed over the first pole layer, the first insulation layer having coil pockets therein, a barrier/seed layer disposed along the walls of the coil pockets in the first insulation layer and copper disposed in the coil pockets and over the first insulation layer to form a coil for inducing a magnetic flux.

In another embodiment of the present invention, a magnetic transducer is provided. The magnetic transducer includes write means for writing data to a magnetic medium, the write means includes means for providing a first pole, first insulation means disposed over the means for providing the first pole, the first insulation means having coil pockets therein, means for providing a barrier/seed layer along the walls of the coil pockets in the first insulation means and copper disposed in the coil pockets and over the first insulation means to form coil means for inducing a magnetic flux.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides an apparatus for patterning a self-aligned coil using a damascene process. The self-aligned coil process packs more copper into the same coil pocket and relaxes the coil alignment tolerance. As we target higher areal density the head design needs to correspondingly shrink. Protrusion is a constant problem that we work to reduce. One way is to pack more copper into the coil pocket. As current is applied into the coil, protrusion is reduced if more copper is packed into the coil pocket. Based on ohm's law, resistance is inversely proportional to the copper thickness. Therefore, an increase in the copper results in lower resistance that leads to lower heat generation and therefore reduced protrusion.

Figure 1:
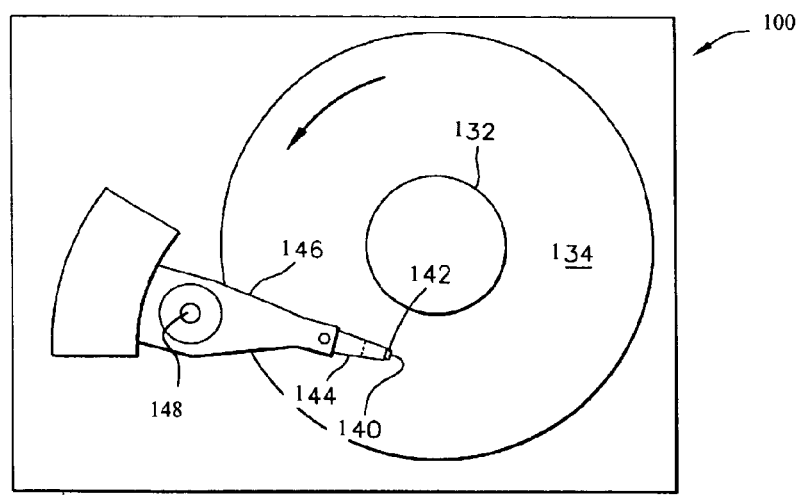
FIG. 1 illustrates a storage system according to the present invention.

FIG. 1 illustrates a storage system 100 according to the present invention. In FIG. 1, a transducer 140 is under control of an actuator 148. The actuator 148 controls the position of the transducer 140. The transducer 140 writes and reads data on magnetic media 134 rotated by a spindle 132. A transducer 140 is mounted on a slider 142 that is supported by a suspension 144 and actuator arm 146. The suspension 144 and actuator arm 146 positions the slider 142 so that the magnetic head 140 is in a transducing relationship with a surface of the magnetic disk 134.

Figure 2:
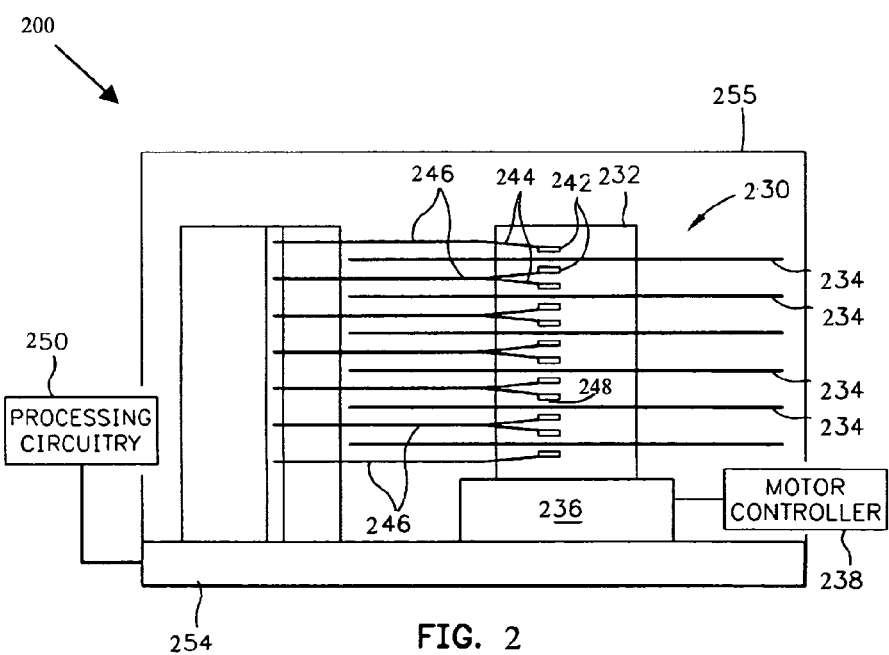
FIG. 2 illustrates one particular embodiment of a storage system according to the present invention.

FIG. 2 illustrates one particular embodiment of a storage system 200 according to the present invention. In FIG. 2, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is mounted on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234 the slider 242 is supported on a thin cushion of air (air bearing) between the surface of the disk 234 and the air bearing surface (ABS) 248. The magnetic head may then be employed for writing information to multiple circular tracks on the surface of the disk 234, as well as for reading information therefrom.

Figure 3:
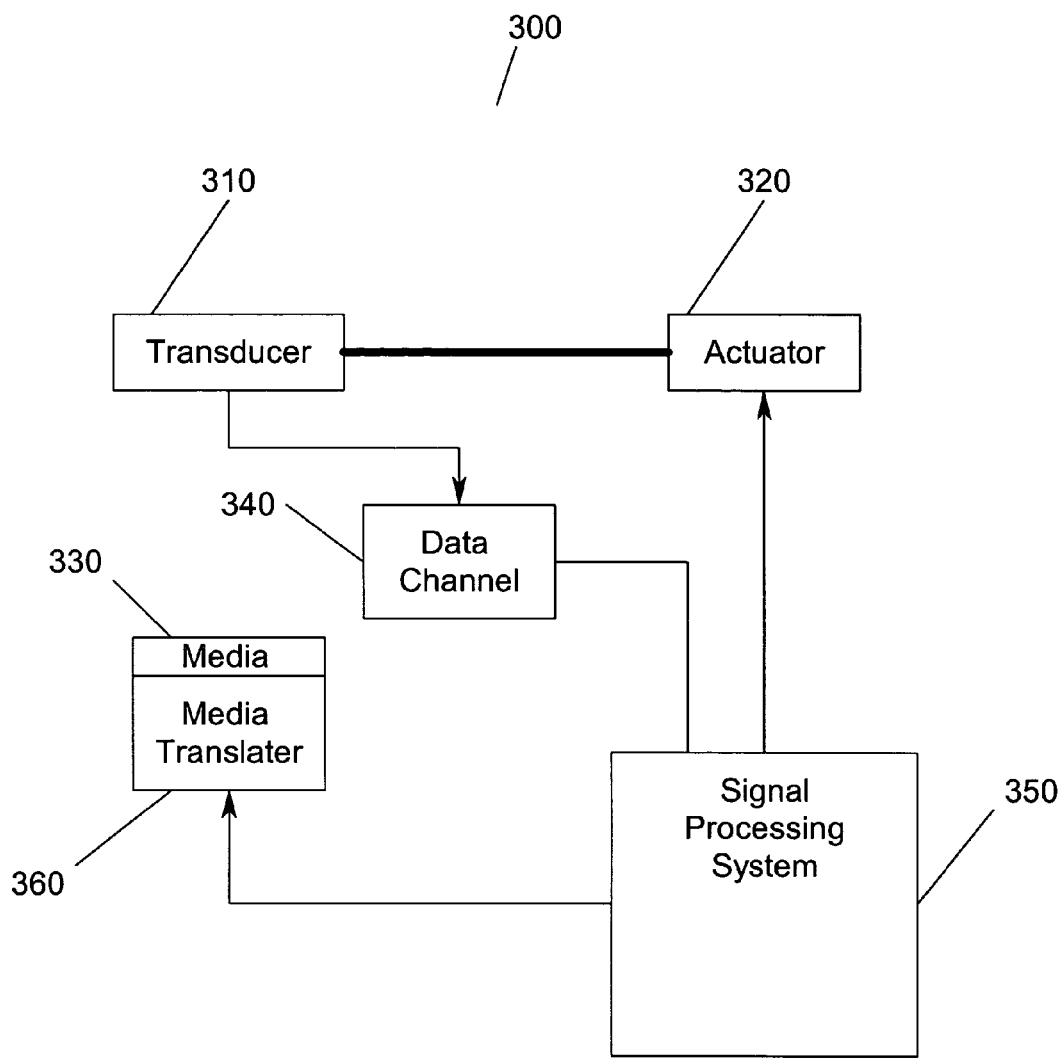
FIG. 3 illustrates a storage system according to the present invention.

FIG. 3 illustrates a storage system 300. In FIG. 3, a transducer 310 is under control of an actuator 320. The actuator 320 controls the position of the transducer 310. The transducer 310 writes and reads data on magnetic media 330. The read/write signals are passed to a data channel 340. A signal processor system 350 controls the actuator 320 and processes the signals of the data channel 340. In addition, a media translator 360 is controlled by the signal processor system 350 to cause the magnetic media 330 to move relative to the transducer 310. Nevertheless, the present invention is not meant to be limited to a particular type of storage system 300 or to the type of media 330 used in the storage system 300.

Figure 4:
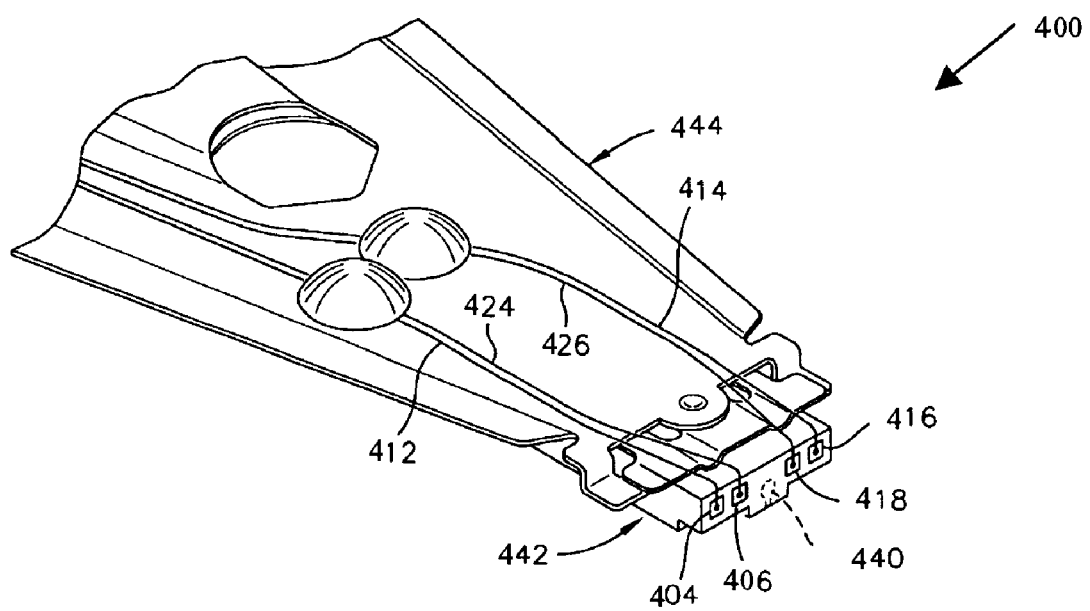
FIG. 4 is an isometric illustration of a suspension system for supporting a slider and a magnetic head.

FIG. 4 is an isometric illustration of a suspension system 400 for supporting a slider 442 having a magnetic head mounted thereto. In FIG. 4 first and second solder connections 404 and 406 connect leads from the sensor 440 to leads 412 and 424 on the suspension 444 and third and fourth solder connections 416 and 418 connect the coil to leads 414 and 426 on the suspension 444. However, the particular locations of connections may vary depending on head design.

Figure 5:
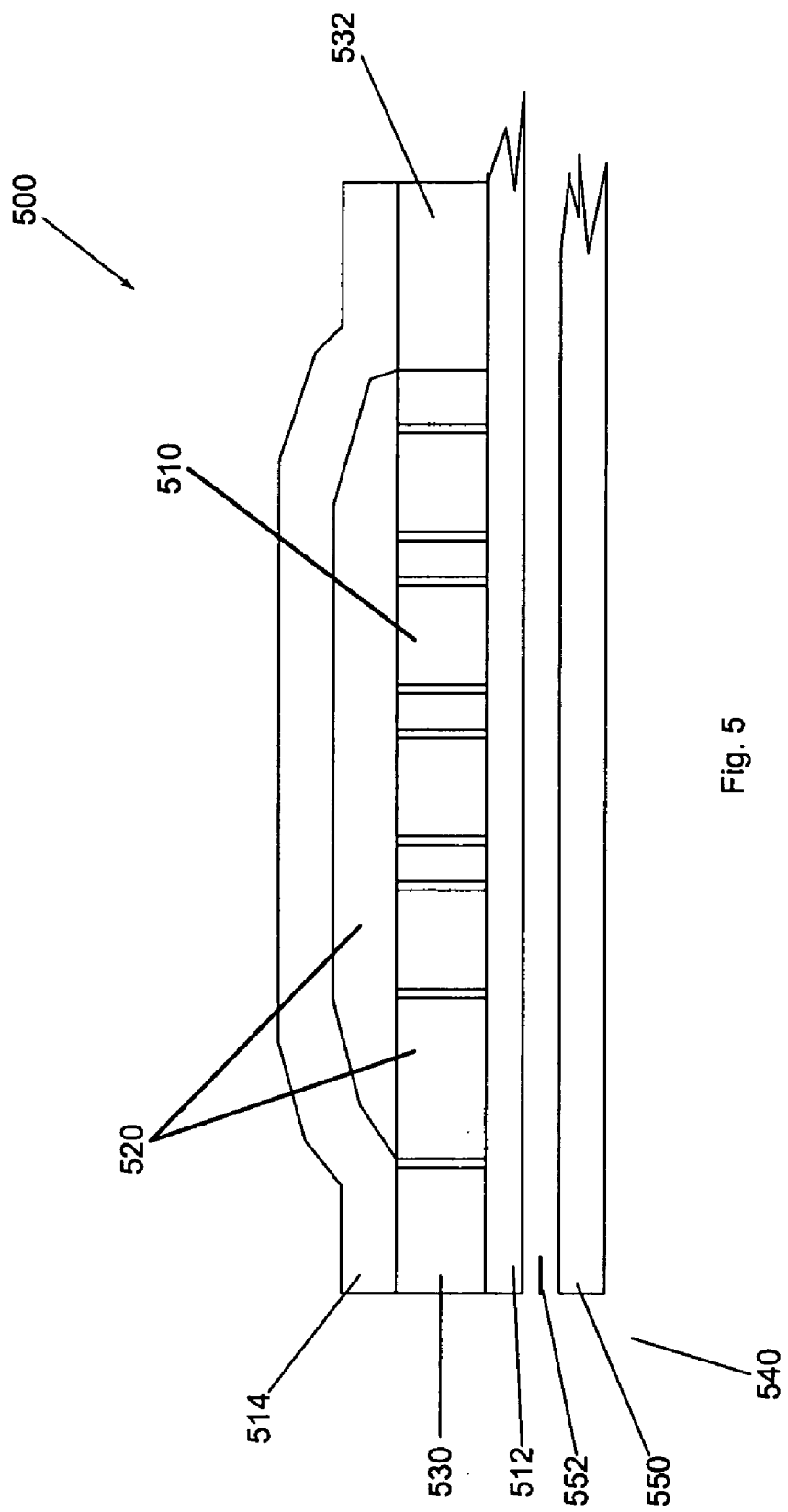
FIG. 5 illustrates a single layer coil design in a magnetic transducer.

FIG. 5 illustrates a single layer coil design in a magnetic transducer 500. FIG. 5 shows a coil 510 formed between a first 512 and second 514 pole piece. An insulating layer of a hard bake resist 520 isolates the coil windings 510. A pedestal 530 is sandwiched between the first pole piece 512 and the second pole piece 514 that are magnetically connected at a back gap 532. The forward ends of the first and second pole pieces 512, 514 form first and second pole tips respectively which are magnetically separated in a transducing relationship at a write gap 534 by the pedestal 530. The width of the second pole tip 514 is critical because it is the last pole tip to induce magnetic flux signals into a moving magnetic medium adjacent the head air bearing surface (ABS) 540 and therefore limits the areal density for the storage device. The read head is provided by a first shield 550, MR sensor 552 and the first pole 512, which also functions as the second shield.

The second pole piece layer 514 is disposed directly above the first pole piece layer 512 with the pedestal 530 disposed therebetween. A back gap layer 532 may also be provided. To increase flux in the first and second pole pieces 512, 514, more current is often used to drive the coil 510. However, an increase in the current through the coil 510, increases heat within the head, which may damage sensitive components in the read sensor and/or cause the insulation stack 520 to expand and protrude the pedestal at the ABS

540. Further, in FIG. 5, the space for the coils 510 is not fully utilized and the spacings for the coils 510 are irregular. For example, the coil 510 is formed by depositing a dielectric film on the first pole 512 to prevent coil to pole shorting (CPS). Then, the coil 510 is fabricated. Next, an insulation layer 520 is deposited over the coil 510. Finally, the pedestal 530 is formed. This causes the pocket for the coil 510 to not be fully utilized.

Figure 6:
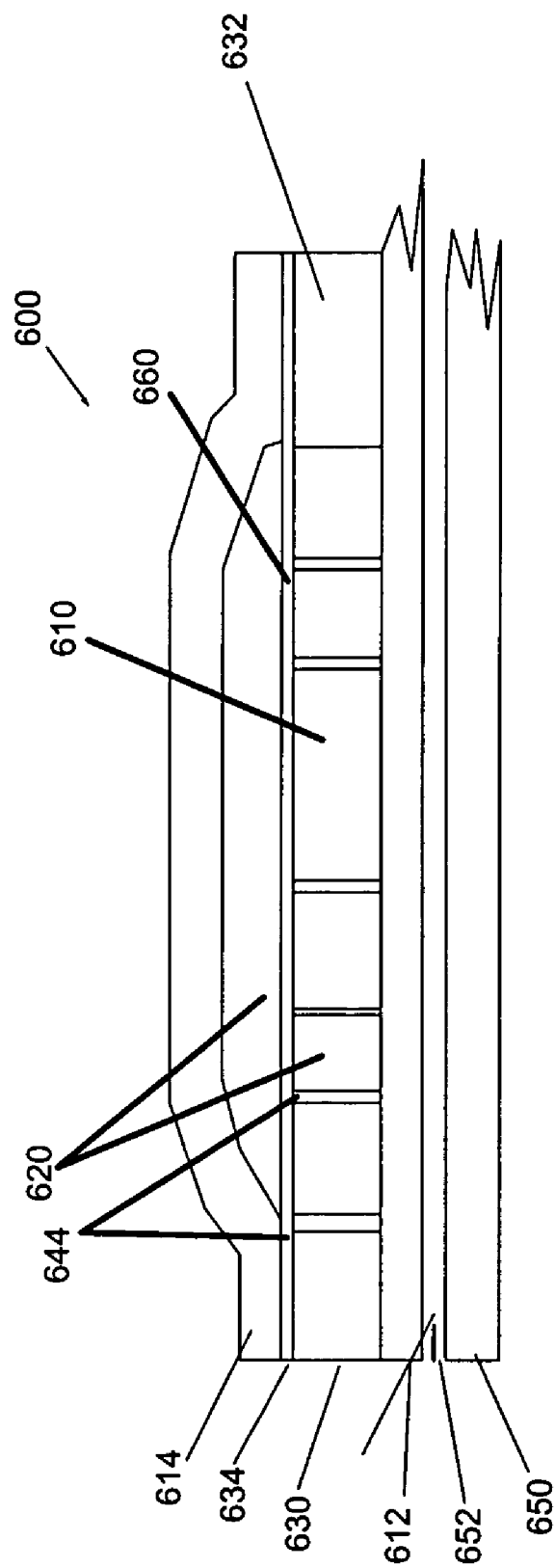
FIG. 6 illustrates a single layer coil for a magnetic transducer patterned using a self-aligning damascene process according to an embodiment of the present invention.

FIG. 6 illustrates a single layer coil for a magnetic transducer patterned using a self-aligning damascene process 600 according to an embodiment of the present invention. In FIG. 6, the coil 610 is again formed between a first 612 and second 614 pole piece. A pedestal 630 is sandwiched between the first pole piece 612 and the second pole piece 614 that are magnetically connected at a back gap 632. A back gap layer 632 may also be provided. A dielectric 644 passivates the first pole 612, the pedestal 630, and the backgap 632 (FPB layer) to prevent contact with copper, i.e., coils 610 resulting in coil to pole shorting (CPS). An insulating layer 620 surrounds the coil.

The forward ends of the first 612 and second 614 pole pieces form first and second pole tips respectively, which are magnetically separated in a transducing relationship by a write gap 634 at the pedestal 630. The read head includes a first shield 650, MR sensor 652 and the first pole 612, which also functions as the second shield. However, the coil 610 illustrated in FIG. 6 more efficiently utilizes the space in the coil pocket and provides regular coil spacing. More copper for the coils 610 is packed in the coil space. Moreover, the likelihood of protrusions is diminished by maximizing the copper in the coil pocket and by reducing the coil resist line 660.

The coil 610 of the magnetic transducer 600 of FIG. 6 is formed using a self-aligned damascene and image transfer processes. This process may be used in perpendicular/longitudinal designs and either single or dual layer coils. Moreover, protrusions are further reduced by maximizing the copper in the coil pocket and reducing the coil resist line 660. Reducing the coil resist line width using conventional lithography is limited by the aspect ratio, i.e., the height of the trench walls is large in comparison to the width. With high aspect ratio structures such as in a coil 610, the reduction of the resist width does not offer sufficient mechanical strength to withstand seed, plating and CMP processes. Nevertheless, this obstacle may be circumvented. A tri-layer method includes an imaging layer, dielectric, and hard bake resist. A bi-layer method includes an imaging layer and dielectric layer. Both methods offer sufficient mechanical strength that is superior to using only a resist. The image transfer process provides the ability to overcome lithographical aspect ratio limitation and provide mechanically stronger structures to withstand further processing, such as seed-layer deposition, plating, and CMP. In addition, the imaging layer can be made in thin resist. This allows use to print, lithographically, smaller coil pitch.

The image transfer approach according to an embodiment of the present invention provides coil lines 610 that are patterned into a hard bake resist 620. Full utilization of the coil pocket is achieved by using a self-align approach. The self-align approach reduces the alignment tolerance by broadening the patterning of the coil lines so that the patterning for the coil lines 610 is not limited to a specific region within the coil pocket, but extends to a broader area extending over the pedestal 630 and the backgap layer 632. The insulator 620 protects first pole layer 612, pedestal 630 and backgap layer 632 so that patterning for the coil 610 may be extended over the pedestal 630 and backgap 632.

Figure 7A:
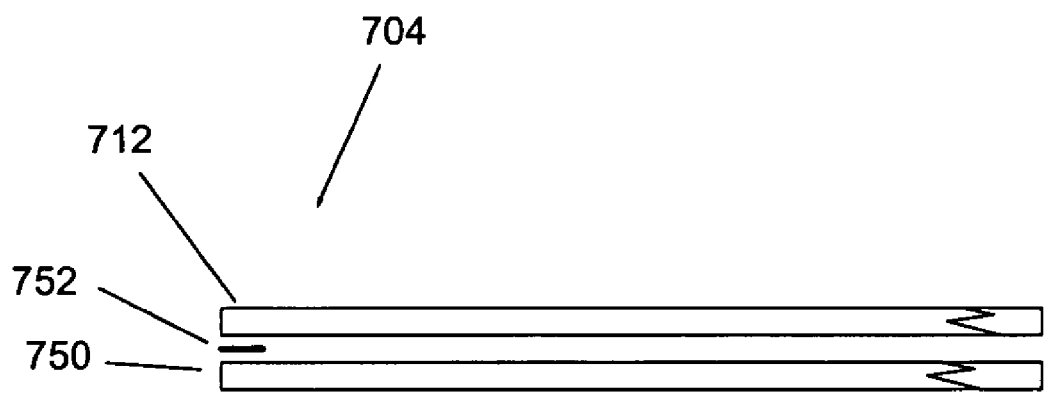
FIGS. 7a–p illustrate the formation of a self-aligned coil using a damascene process according to an embodiment of the present invention.
Figure 7B:
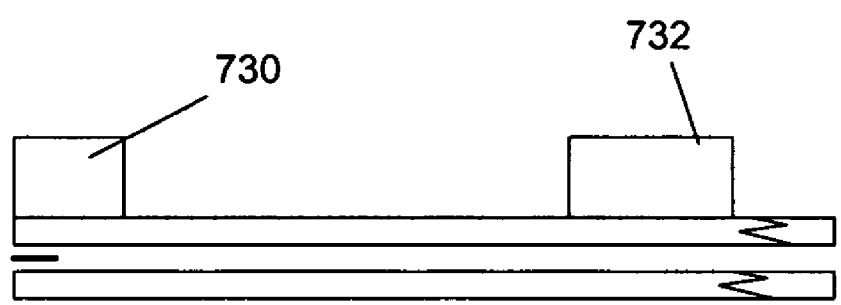
Figure 7C:
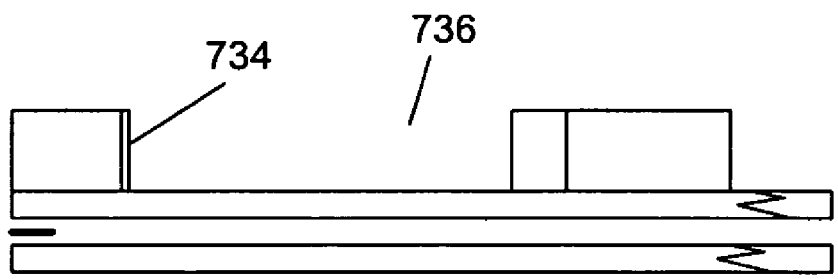
Figure 7D:
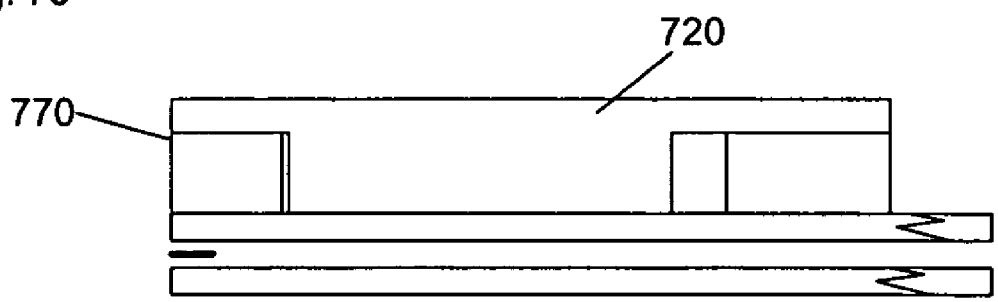
Figure 7E:
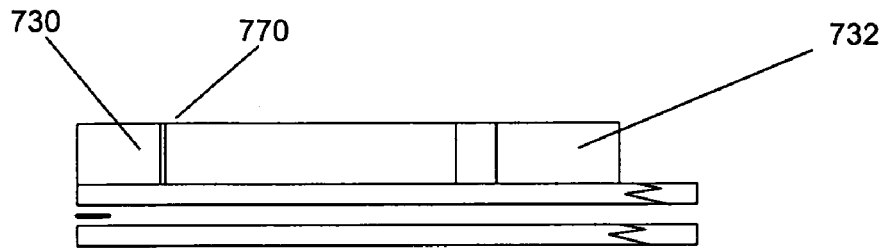
Figure 7F:
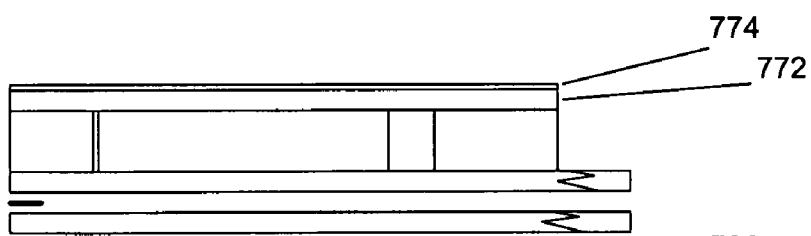
Figure 7G:
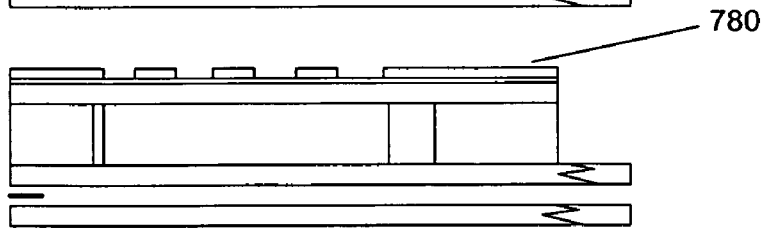
Figure 7H:
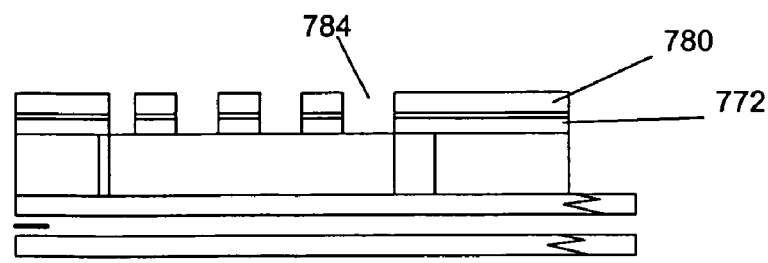
Figure 7I:
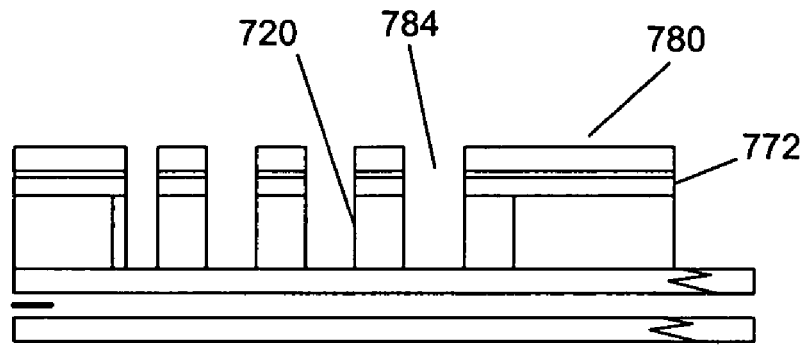
Figure 7J:
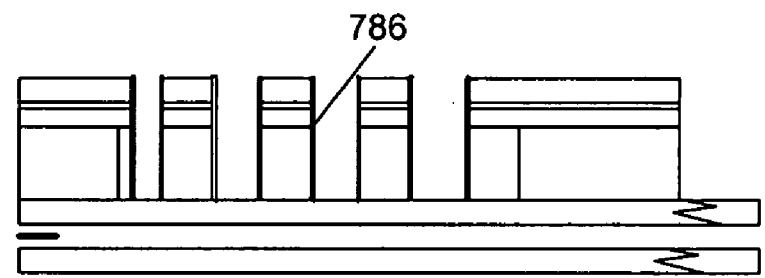
Figure 7K:
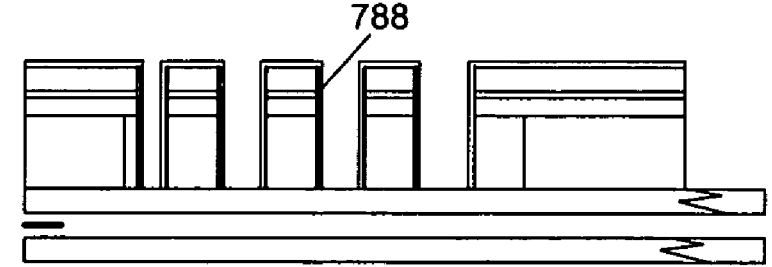
Figure 7L:
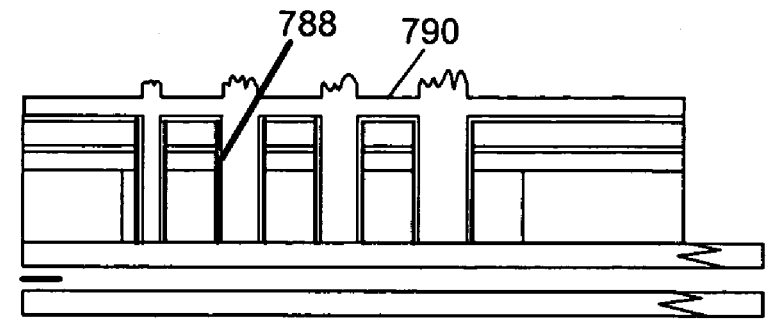
Figure 7M:
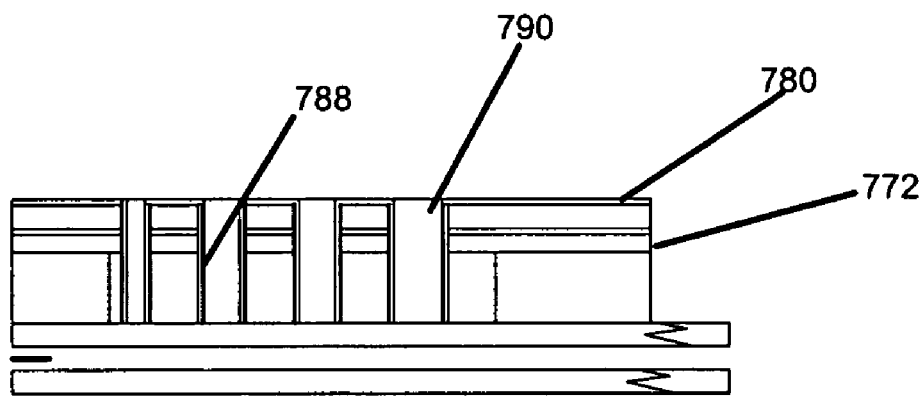
Figure 7N:
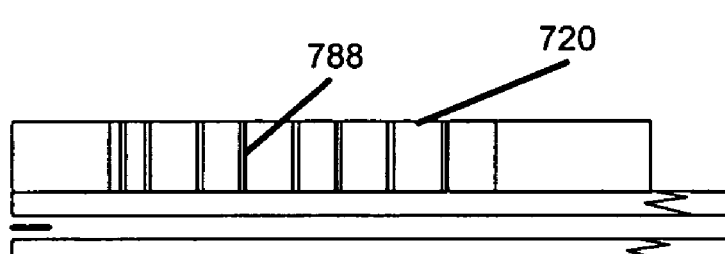
Figure 7O:
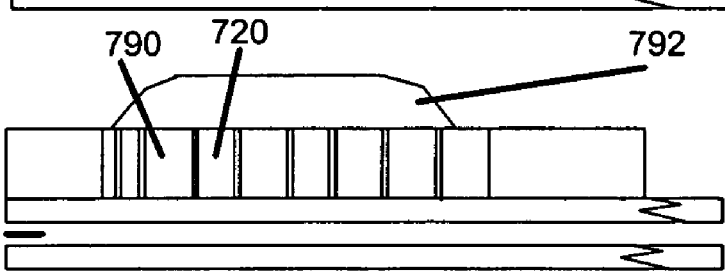
Figure 7P:
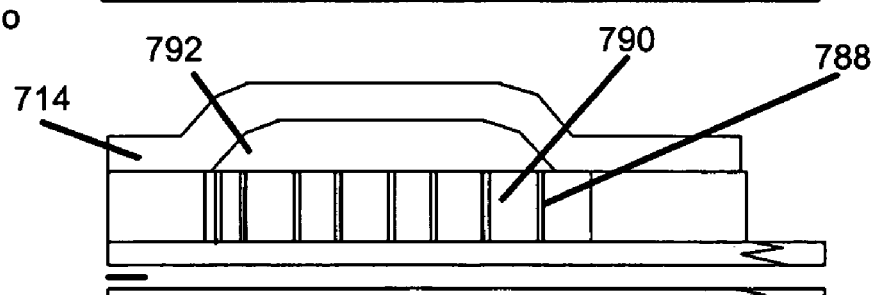

FIGS. 7*a–p* illustrate the formation of a self-aligned coil using a damascene process according to an embodiment of the present invention. In FIG. 7*a* the read head 704 including a first shield layer 750, the magnetoresistive (MR) element 752 and the second shield layer/first pole 712 are fabricated. The read sensor 752 is shown disposed between the first 750 and second shields 712. The magnetoresistive element 752 may be an AMR element, a GMR element or any other magnetoresistive element.

FIG. 7*b* shows the back gap layer 732 and pedestal 730 being deposited. Then, in FIG. 7*c*, a first non-magnetic, non-conductive material 734, such as $Al_2O_3$, is deposited in the gap 736 between the backgap layer 732 and the pedestal 730. A hard bake resist 720 is deposited and cured in FIG. 7*d*. The hard bake resist 720 is etched via CMP to the height 770 of the first non-magnetic, non-conductive material 734 on the pedestal 730 and back gap layer 732 in FIG. 7*e*.

CMP (Chemical Mechanical Planarization) is the process by which a surface is made even by removal of material from any uneven topography. As its name indicates, CMP is a combination of a mechanical polishing with a chemistry that includes abrasives and either an acid or base to achieve the desired effects. FIG. 7*f* shows the deposit of a layer of reactive ion etchable dielectric 772, such as $SiO_2$, which is preferred.

An anti-reflective layer 774 may also be deposited. When the hardbake layer 720 is cured (fully crosslink), it is mostly opaque at 365 nm and 248 nm wavelength. Although $SiO_2$ is transparent at these wavelengths, reflectivity will still be minimal since the hardbake layer 720 is opaque. Thus, an anti-reflective layer 774 is used more as an adhesion promoter since resist adhesion to $SiO_2$ is poor.

Formation of the coil element is accomplished using a self-aligned damascene process. A damascene process is a process in which metal structures are delineated in dielectrics isolating them from each other not by means of lithography and etching, but by means of chemical-mechanical planarization (CMP). In this process, an interconnect pattern is first lithographically defined in the layer of dielectric, metal is deposited to fill resulting trenches and then excess metal is removed by means of chemical-mechanical polishing (planarization).

The self-aligned damascene process allows grooves to be formed in an insulating layer and filled with metal to form conductive windings having the maximizing amount of copper deposited in the coil pocket and reduced coil resist line. In FIG. 7*g*, photoresist 780 for the self-aligned coil is developed. FIG. 7*h* shows the removal of the reactive ion etchable dielectric layer 772 using reactive ion etching within the window 784 of the photoresist 780. In FIG. 7*i*, the patterned reactive ion etchable dielectric layer 772 is patterned transferred into the hard bake resist to remove the hard bake resist 720 within the window 784 of the photoresist 780 and the reactive ion etchable dielectric layer 772 using reactive ion chemical etching. This produces a slightly tapered profile, which is important because a vertical profile does not allow the coil pockets 784 to be completely filled when depositing copper is formed in the coil pockets 784.

Then, a second layer of non-magnetic, non-conductive material 786, such as $Al_2O_3$, may be deposited. This layer 786 is thin and provides a first barrier to prevent copper from touching the pedestal or backgap during seeding. However, second layer of non-magnetic, non-conductive material 786 could be by-passed by making seed layer 788 shown in FIG. 7*k* thicker.

In FIG. 7*k*, a thin seed layer 788, such as Ta/Cu, is deposited to provide an adhesion layer so the copper will adhere to the wall. However, as mentioned above, the seed layer may include a first sublayer, such as tantalum and the first sublayer may be made thicker to prevent copper from touching the pedestal or backgap.

In FIG. 7*l*, copper 790 is deposited using a damascene process to achieve super-filling without voids. This process eliminates the alignment tolerance issue. This intermediate structure wherein the copper 790 is deposited using a damascene process to achieve super-filling without voids is then provided to a CMP station for planarizing and further fabrication of the head.

FIGS. 7*m–p* illustrate the CMP processes and the further fabrication of the head. In FIG. 7*m*, the copper 790 is removed by CMP until the linear plane of the seed layer 788 is contracted using a slurry. FIG. 7*n* shows the resulting structure after using a second slurry to remove material until the hard bake resist 720 is encountered. Portions of the Ta sublayer 788 remain. In FIG. 7*n*, copper 790, reactive ion etchable dielectric 772, the photoresist layer 780 and a portion of the Ta sublayer 788 shown in FIG. 7*m* are removed. A second hard bake resist layer 792 is deposited over the first hard bake layer 720 and the copper 790 to isolate the copper coil in FIG. 7*o*. The second pole 714 is then formed over the second hard bake resist 792 to complete the head in FIG. 7*p*. The Ta sublayer 788 and copper coils 790 are visible in FIG. 7*p*.

Accordingly, embodiments of the present invention provide an apparatus for patterning a self-aligned coil using a damascene process. The first insulation layer (FIG. 7C, 734) fully protects the FPB layer (the top and also the sidewall of the pole layer and the Ta layer or layer 786 protects copper from touching the pedestal and backgap. This would allow the coil alignment tolerance to be more relaxed. Because the pedestal, backgap and the first pole are protected with an insulator, the coil pattern could be extended over the pedestal and backgap. The last turn of the coil may also be made larger to fully utilize the coil pocket without worry of shorting because the FPB layer is protected. The self-aligned coil process packs more copper into the same coil pocket and relaxes the coil alignment tolerance. Protrusions are prevented because of the more efficient and uniform spacing of the coil to reduce heat buildup in the head during a write.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A magnetic transducer, comprising:
  a write head, comprising:
    a first pole layer;
    a pedestal formed at a first end of the first pole layer at the pole tip of the first pole layer;
    a backgap formed at a second opposite end of the first pole layer;
    a first and second insulator comprising a non-magnetic, non-conductive material deposited between the pedestal and the backgap, the first insulator abutting the pedestal and the second insulator abutting the backgap, the first and second insulator separated by a predetermined distance;
    a hard baked resist layer disposed over the first pole layer between the first and second insulator, the hard baked resist layer having coil pockets formed therein, formed between the hard baked resist layer and the first insulator and formed between the hard baked resist layer and the second insulator;
    a barrier layer disposed along the walls of the coil pockets;
    a seed layer disposed along the barrier layer; and
    copper disposed in the coil pockets along the seed layer to form a coil for inducing a magnetic flux.

2. The magnetic transducer of claim 1 further comprising:
  a second insulation layer disposed over the copper in the coil pockets and over the first insulation layer and at least a portion of the first and second insulator; and
  a second pole layer disposed over the second insulation layer.

3. The magnetic transducer of claim 1 wherein the barrier layer further comprises a tantalum layer and the seed layer further comprises copper.

4. The magnetic transducer of claim 1 further comprising:
  a read head, the read head comprising:
    a first shield layer;
    a second shield layer, the second shield layer functioning as the first pole layer; and
    a magnetoresistive element disposed between the first and second shield layers.

5. A magnetic storage device, comprising:
  magnetic media for storing data thereon;
  a magnetic transducer for reading and writing data on the magnetic media;
  a motor for translating the position of the magnetic media; and
  an actuator for positioning the magnetic transducer relative to the magnetic media;
  wherein the magnetic transducer further comprises:
    a write head, the write head further comprises:
      a first pole layer;
      a pedestal formed at a first end of the first pole layer at the pole tip of the first pole layer;
      a backgap formed at a second opposite end of the first pole layer;
      a first and second insulator comprising a non-magnetic, non-conductive material deposited between the pedestal and the backgap, the first insulator abutting the pedestal and the second insulator abutting the backgap, the first and second insulator separated by a predetermined distance;
      a hard baked resist layer disposed over the first pole layer between the first and second insulator, the hard baked resist layer having coil pockets formed therein, formed between the hard baked resist layer and the first insulator and formed between the hard baked resist layer and the second insulator;
      a barrier layer disposed along the walls of the coil pockets;
      a seed layer disposed along the barrier layer; and
      copper disposed in the coil pockets along the seed layer to form a coil for inducing a magnetic flux.

6. The magnetic storage device of claim 5 further comprising:
  a second insulation layer disposed over the copper in the coil pockets and over the first insulation layer and at least a portion of the first and second insulator; and
  a second pole layer disposed over the second insulation layer.

7. The magnetic storage device of claim 5 wherein the barrier layer further comprises a tantalum layer and the seed layer further comprises copper.

8. The magnetic storage device of claim 5 further comprising:
- a read head, the read head comprising:
  - a first shield layer;
  - a second shield layer, the second shield layer functioning as the first pole layer; and
  - a magnetoresistive element disposed between the first and second shield layers.

9. A magnetic transducer, comprising:
- write means for writing data to a magnetic medium, the write means comprising:
  - means for providing a first pole;
  - means for providing a pedestal formed at a first end of the means for providing the first pole layer at a pole tip of the means for providing the first pole layer;
  - backgap means formed at a second opposite end of the first pole layer:
  - a first and second insulator means comprising a non-magnetic, non-conductive material deposited between the means for providing a pedestal and the means for providing a backgap, the first insulator means abutting the means for providing a pedestal and the second insulator means abutting the means for providing a backgap, the first and second insulator means separated by a predetermined distance:
  - means for providing a hard baked resist layer disposed over the means for providing a first pole layer and between the first and second insulator means, the means for providing hard baked resist layer having coil pockets formed therein, formed between the means for providing hard baked resist layer and the first insulator means and formed between the means for providing hard baked resist layer and the second insulator means;
  - means for providing a barrier layer disposed along the walls of the coil pockets;
  - means for providing a seed layer disposed along the barrier layer; and
  - copper disposed in the coil pockets along the seed layer to form a coil for inducing a magnetic flux.

* * * * *